United States Patent [19]
Versen

[11] 3,794,098
[45] Feb. 26, 1974

[54] TIRE REPAIR OR INSTALLATION METHOD AND SEAL DEVICE THEREFOR

[76] Inventor: Michael A. Versen, P.O. Box 1848, Morgan City, La. 70380

[22] Filed: June 5, 1972

[21] Appl. No.: 259,942

[52] U.S. Cl........... 152/428, 152/429, 152/DIG. 13, 220/27, 222/541, 285/3
[51] Int. Cl. ............................................. B60c 29/00
[58] Field of Search............... 152/429-427, DIG. 7, 152/DIG. 13, 431; 138/90-95; 285/4, 3, 1, 2; 220/27; 222/541

[56] References Cited
UNITED STATES PATENTS
2,580,343  12/1951  Benoit........................ 152/DIG. 13

Primary Examiner—Gerald M. Forlenza
Assistant Examiner—Richard A. Bertsch
Attorney, Agent, or Firm—Raphael Semmes

[57] ABSTRACT

The valve stem of an assembled and inflated pneumatic tire and wheel assembly is equipped with a frangible seal, the seal being so constructed and arranged that such must be destroyed before air can again be placed in the assembly. In the method the destructible seal is used with a record system to ensure the proprietor that he is receiving pay for tire installations and repairs made by his employees, and to give a guarantee to the customer.

8 Claims, 9 Drawing Figures

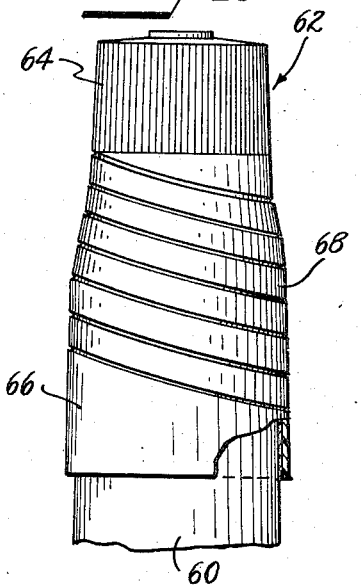
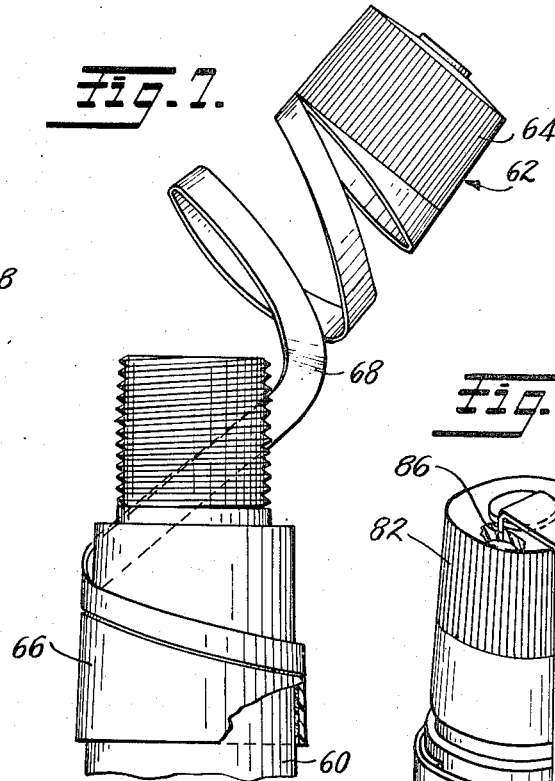
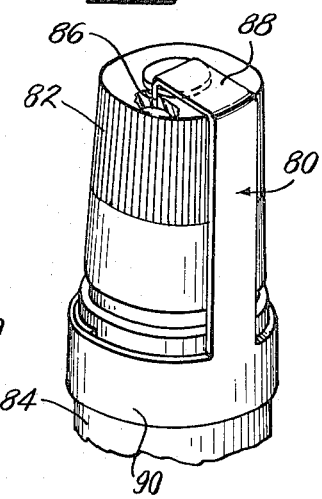

TIRE REPAIR OR INSTALLATION METHOD AND SEAL DEVICE THEREFOR

BACKGROUND OF THE INVENTION

1. Field of the Invention

The present invention relates generally to the installation and repair of pneumatic tire assemblies. More particularly, it relates to a method for installing and repairing a tire assembly wherein a frangible seal is attached to the tire valve stem after the tire assembly is inflated, said seal being so arranged and constructed that such must be destroyed before air can again be placed in the assembly.

2. Description of the Prior Art

Pneumatic tire assemblies are in common use on automobiles, trucks, tractors and other vehicles, and include a resilient tire which is mounted on a metal wheel or rim. The tire can be of either the tube or the tubeless type, and in either case such is inflated by use of a valve stem carrying a valve element, and to which a source of compressed air is temporarily connected. When the pneumatic tire has been properly inflated, a cap member is usually threaded on the outer end of the valve stem to protect the valve element.

Tire installations and repairs are commonly made in filling stations and tire stores by employees thereof, who are expected to charge therefor. It occurs in some instances that the work is done and the charge made, but the employee fails to report the sale incident. In such cases the proprietor obviously is not receiving his due.

There is thus need for a system that will help ensure that all tire installations and repairs are reported to the proprietor, and the present invention is directed in part to fulfilling that need.

When a tire has been installed or repaired, the customer normally would like a guarantee as to the quality of the work. However, at present the proprietor sometimes is reluctant to offer such a guarantee, because he cannot be certain when a tire is returned damaged that such has not been tampered with by someone else between when it left his place of business and when the return occurs. The present invention is also addressed to this problem, and provides a means to determine whether or not access has been obtained to the valve stem, this being a good indicator of whether or not the tire has been tampered with.

SUMMARY OF THE INVENTION

In the preferred embodiment of the present invention, the valve stem and cap member of a tire and wheel assembly are provided with a seal device, which can be of any one of several possible constructions. After a tire has been installed or repaired, and inflation to the proper pressure has been completed, the cap member is threaded into place, and the seal device is then installed. Thereafter, the cap member cannot be removed to give access to the valve stem without destroying the seal, a fact which therefore makes it evident when a valve stem on a tire has been tampered with.

The destructible seal of the invention is employed in a unique tire installation method and record system, to help solve the problem of an employee not reporting a sales incident, and to help give a customer the satisfaction of a guarantee. In the system of the invention the proprietor advertises that he is offering a unique service in the installation and repair of tires, one wherein he seals each tire stem and thereafter guarantees a free repair if a damged tire (due to faulty repair) is returned to him with the seal unbroken.

The obvious advantages of such a system to the customer will induce him to make use of the guarantee service, and thus when a tire is to be installed or repaired the customer will ask for the seal to be installed. In order for the employee to obtain the necessary seal he will need to go to the proprietor or his agent, and obtain a numbered seal, the issuance of which will be recorded in a suitable ledger along with the date and the name of the customer.

The employee then installs the numbered seal on the valve stem, thereby giving the guarantee of workmanship to the customer. At the same time, the proprietor, having possession of the records, will known that a sales incident has occurred, and can collect from his employee.

While the present method and its destructible seal can obviously be used to great advantage by a small business with only one or two outlets, it will prove even more advantageous to the chain type of operation. In the latter case the various outlets of the chain will offer the sealing service, and the guarantee will be good in any outlet of the chain, wherever located. The commercial possibilities of such an arrangement are obvious, and need not be enlarged upon.

It is an object of the present invention to provide a means whereby it can be readily determined that the valve stem of a pneumatic tire assembly has been tampered with to gain access thereto.

Another object is to provide a method and system whereby a proprietor can be assured that his employees will report the installation or repair of a tire.

A further object is to provide a method and system whereby a proprietor can grant a guarantee to a customer for a tire installation or repair, secure in the knowledge that he will not be asked to repair a tire tampered with by someone else.

Other objects and many of the attendant advantages of the present invention will become readily apparent from the following description of the preferred embodiments, when taken together with the accompanying drawings.

BRIEF DESCRIPTION OF THE DRAWINGS

FIG. 6 is a fragmentary elevational view, partly in section, of still another form of valve cap seal;

FIG. 7 is a fragmentary exploded elevational view showing the cap seal of FIG. 6 destroyed upon removal of the valve stem cap;

FIG. 8 is a perspective view of a modified form of cap seal similar to the preferred embodiment of FIG. 1; and FIG. 9 is a diagram illustrating the steps in the method and system of the present invention for making use of the destructible seal.

DESCRIPTION OF THE PREFERRED EMBODIMENTS

Figure 1:
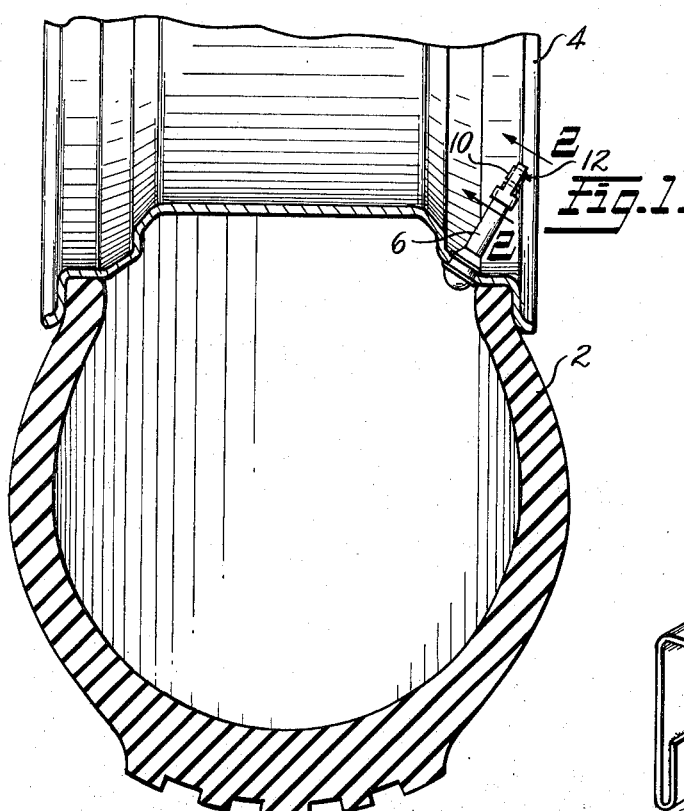
FIG. 1 is a fragmentary sectional view of a tubeless tire installed on a rim, with the valve stem and cap member in place, and with the seal of the preferred embodiment of the invention installed thereon.
Figure 2:
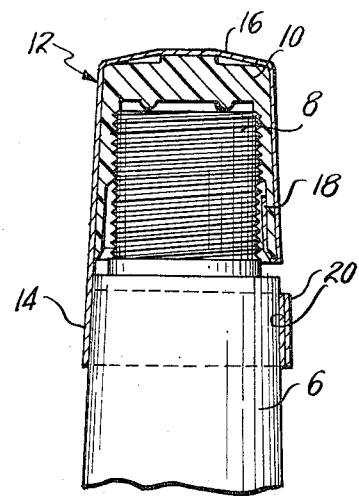
FIG. 2 is an enlarged fragmentary vertical sectional view through the valve stem, cap member and seal of FIG. 1, taken generally along the line 2—2 of FIG. 1.
Figure 3:
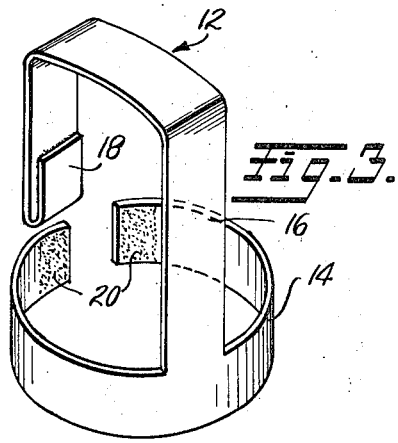
FIG. 3 is an enlarged, perspective view of the preferred embodiment of the seal member of the invention.

Referring now to FIGS. 1-3 of the drawings, a tubeless tire 2 is shown mounted upon a rim 4, the rim 4 being fitted with a valve stem 6 having a threaded portion 8 on its outer end onto which a cap member 10 is threaded when inflation of the tire and wheel assembly is completed. It is to be understood that the valve stem 6 can be of any suitable construction, and can be mounted on a tube in the case of a conventional tire and tube arrangement, without in any way affecting the present invention. All that is necessary in the embodiment of FIGS. 1-3 is that the valve stem 6 protrude from the tire and wheel assembly, and that it have a cap member 10 threadably mounted thereon.

The cap member 10 and valve stem 6 of FIGS. 1-3 are fitted with a seal member 12, the installation of which is completed after the tire assembly has been properly inflated and the cap member has been threaded into place. The seal member 12, as best shown in FIG. 3 is made of flexible plastic tape or another suitable frangible material, and includes a split annular band portion 14 having a narrow strip 16 formed integrally therewith and projecting normally from the midpoint of the band portion. The narrow strip 16 terminates in an inturned tab 18 that is coated with a suitable adhesive (not shown), and which is pressed against the interior wall of the cap member 10 to secure the seal thereto (as seen in FIG. 2). The narrow strip 16 is wrapped or bent over the cap member 10 to form an inverted U-shape, such being of sufficient length so that when the legs of the U-shaped strip portion are engaged with the cap member 10, the split annular band portion 14 will be disposed below the cap member 10 in position to be wrapped about the valve stem 6.

The inner end surfaces of the annular band portion 14 have adhesive 20 thereon, and when the cap member 10 is in place, the band portion 14 is wrapped about the valve stem 6 and secured in place by means of the adhesive 20. The seal member 12 is then fully installed, and thereafter the cap member 10 cannot be removed from the valve stem 6 without destroying said seal member.

The seal member 12 can have any desired message, or none, imprinted thereon. However, when used with the system of the invention, it is contemplated that such will at least have an identification number printed in an obvious location thereon, and possibly information about the guarantee the seal member offers.

The method of the invention in its preferred form is illustrated step-by-step in FIG. 9 of the drawing, reference to which is now made. In the first step of the method the seal members 12 are assembled to valve cap members 10, and the cap members are then issued to repairmen or employees by the station manager or proprietor, the identification number of each issued seal member being recorded, preferably together with the name of the customer and the date. This can be done either before or after the employee has assembled and inflated the tire and wheel assembly. Replacement of previously guaranteed seals must include records of the customer's signature and address, in order to assure the proprietor that a faulty repair guarantee has been replaced rather than the original guarantee sold. The manager and repairman shall not be charged for replacement seals.

In the second step, the manager or proprietor receives payment for the issued seal-equipped cap member, or such is charged against the employee or repairman. This ensures that the repairman or employee will not seek issuance of more seal members than he needs, since he will be held responsible for each one withdrawn.

With the seal member issued and recorded, and the employee or repairman having either paid for the same or had it charged against him, the seal member and the cap to which it is attached are then installed on the tire assembly. This establishes the guarantee to the customer, and thereafter if the tire is returned damaged (step 4 in FIG. 9) and the seal is unbroken, the tire will be repaired free of charge.

It is obvious that the novel method of the invention as just described offers advantages both to the proprietor of the tire business, and to the customer. The former is assured he will receive money for each sale incident, and the latter is assured of a free repair if the seal is unbroken when he returns the tire in a damaged condition (Due to faulty repair). Normally, the charge by the proprietor or manager for the seal will equal the charge for installing or repairing a tire, so that full recovery of the sale amount is assured.

By proper advertising of the service, over time nearly every customer will come to ask for the guarantee, thus ensuring that the service will be used in nearly all cases.

Figure 5:
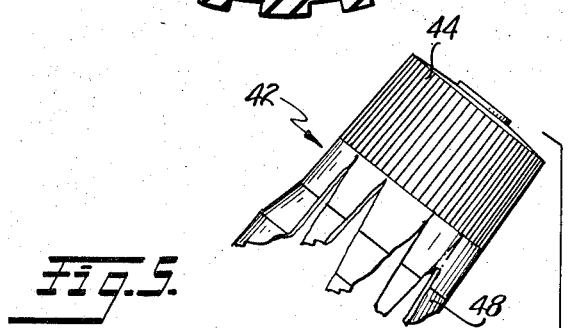
FIG. 5 is a fragmentary, exploded elevational view showing the seal embodiment of FIG. 4 in its broken condition, following removal of the valve stem cap member.
Figure 4:
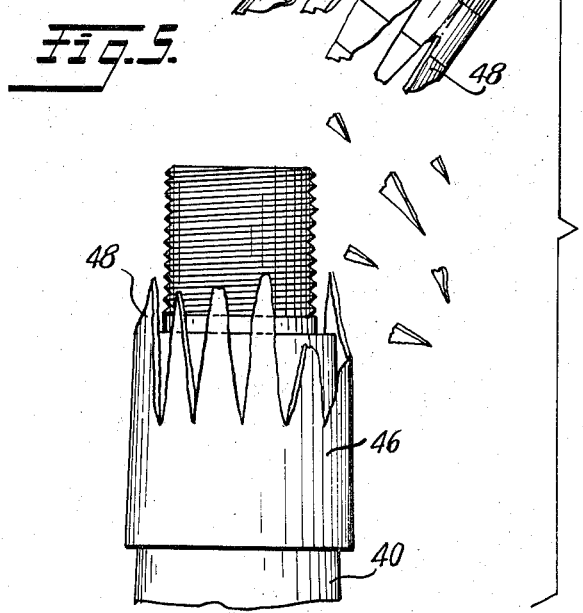
FIG. 4 is a fragmentary elevational view, partly in section, of another form of seal, wherein the seal is formed integrally with the valve cap.
Figure 4:
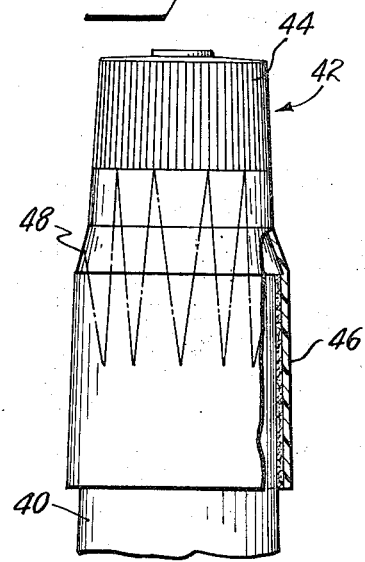

The seal member can obviously take several different forms, without departing from the inventive concept of the invention. A first alternative form is shown in FIGS. 4 and 5, wherein a valve stem 40 is fitted with a special cap member 42 that has an integrally formed seal member. The cap member 42 includes a threaded head portion 44 much like the conventional valve stem cap 10 of FIGS. 1-3, and having a skirt portion 46 connected thereto by an intermediate scored portion 48. The scores on the intermediate portion 48 are in the form of saw teeth.

When it is desired to install the cap sealing member 42, the interior of the skirt portion 46 and/or the exterior surface of the valve stem 40 is coated with adhesive. The cap member 42 is then installed, and the adhesive allowed to set. Thereafter, when the cap member 42 is turned to remove the same, the scored portion 48 will rupture as in FIG. 5 along the saw tooth scores, thereby destroying the seal and giving a clear indication that the tire assembly has been tampered with.

Another destructible integral cap seal member is shown at 62 in FIGS. 6 and 7, fitted onto a valve stem 60. The cap member 62 is similar to the cap member 60, and includes a threaded head portion 4, a skirt portion 66 that is secured by adhesive to the valve stem 60, and a frangible intermediate portion 68 that is spirally scored. The spiral scores will cause the cap seal member 62 to destruct when such is unthreaded from the valve stem 60, as shown in FIG. 7.

Yet another embodiment for the seal member of the invention is shown in FIG. 8, the seal member 80 therein being similar in several respects to the seal member 12. The cap member 82 in FIG. 8 is threaded in the usual manner onto a valve stem 84, but has a slot 86 in the top thereof into which the end portion of a narrow frangible strip 88 is inserted and secured by adhesive or other suitable means. The free end of the strip 88 connects medially to a split band 90 that is of identical construction to the split band 14, and which is wrapped around and adhesively secured to the valve stem 84 after the cap member 82 is installed in place.

Obviously, yet other seal embodiments can be devised that would work satisfactorily with the method and system of the invention. What is necessary is a seal member that will clearly indicate when a valve member has been tampered with, to make it possible to connect a source of pressurized air thereto. Should a valve cap member not be employed for any reason, a seal member like the member 12 shown in FIGS. 1-3 can even be directly installed over the valve element in the open end of the valve stem.

The method and system of the invention makes it possible for the proprietor to keep a careful count on sales incidents, and also provides a guarantee arrangement for the customer in which the proprietor can have confidence. It is therefore seen that all of the objects hereinabove set forth for the invention have been satisfied.

What I claim is:

1. In combination with a pneumatic tire and wheel assembly having a valve stem, frangible seal means installed on said valve stem, and so constructed and arranged that such must be destroyed before access can be obtained to said valve stem for placing air into said assembly.

2. In combination with a pneumatic tire and wheel assembly having a valve stem; a cap member threadably received on said valve stem; and a frangible seal member carried by said cap member and secured to said valve stem, and so arranged and constructed that such must be destroyed during removal of said cap member from said valve stem.

3. In combination with a pneumatic tire and wheel assembly as recited in claim 2, wherein said seal member is formed separately from but is secured to said cap member.

4. In combination with a pneumatic tire and wheel assembly as recited in claim 3, wherein said seal member comprises: a first portion attached to said cap member; a split annular band portion securable to said valve stem; and a strip portion connecting said band portion with said first portion, at least said strip portion being made of frangible material.

5. In combination with a pneumatic tire and wheel assembly as recited in claim 2, wherein said seal member is formed integrally with said cap member, said cap member including a threaded head portion receivable on said valve stem, and said seal member including: a skirt portion securable by adhesive to said valve stem by adhesive when said cap member is threaded on said valve stem; and a frangible intermediate portion connecting said head portion with said skirt portion.

6. The method for installing or repairing a tire assembly to visually indicate completion of the work by a specific place of business and constitute an indicator of guaranteed workmanship, comprising the steps of: mounting a tire upon a rim; inflating the tire to its proper pressure through a valve stem connected with the assembly; and preventing undetectible subsequent access to the valve stem by placing a frangible seal means on the valve stem that is destroyed when subsequent access to said valve stem for placing air into said assembly is attempted.

7. The method as recited in claim 6, wherein said seal means includes an identification number, and including the further step of recording said identification number.

8. The method for installing or repairing a tire assembly to visually indicate completion of the work by a specific place of business and constitute an indicator of guaranteed workmanship, said assembly including a tire, a rim, and a valve stem for inflating said tire after such has been placed on said rim, said method comprising the steps of: inflating said tire assembly to its proper pressure through said valve stem; obtaining from a person in management a frangible seal; and preventing undetectible subsequent access to the valve stem by placing said frangible seal on said valve stem that is destroyed when subsequent access to said valve stem for placing air into said assembly is attempted.

* * * * *